United States Patent [19]
Herbener et al.

[11] 3,940,123
[45] Feb. 24, 1976

[54] CUTTING MACHINE CLAMPING DEVICE

[75] Inventors: Klaus Herbener, Bruchkobel; Ewald Schmitt, Bischifsheim, both of Germany

[73] Assignee: Messer Griesheim GmbH, Frankfurt am Main, Germany

[22] Filed: Oct. 2, 1974

[21] Appl. No.: 511,368

[30] Foreign Application Priority Data
Oct. 18, 1973  Germany.............................. 2352295

[52] U.S. Cl................. 266/23 R; 148/9 R; 164/263
[51] Int. Cl.².......................................... B23K 7/10
[58] Field of Search...... 148/9 R; 266/23 R, 23 HH, 266/23 KC, 23 F, 23 K, 23 L, 23 M, 23 B, 23 E, 23 C; 164/263, 70, 82, 87

[56] References Cited
UNITED STATES PATENTS

| | | |
|---|---|---|
| 3,227,432 | 1/1966 | McDermott....................... 266/23 R |
| 3,497,195 | 2/1970 | Kalkhof............................ 266/23 R |
| 3,558,117 | 1/1971 | Hess................................. 266/23 R |

Primary Examiner—Gerald A. Dost
Attorney, Agent, or Firm—Connolly and Hutz

[57] ABSTRACT

A cutting machine for separating workpieces includes a cutting unit which is mounted above a workpiece to traverse the width of the workpiece and cut therethrough. The mounting means includes rails disposed over and across the workpiece over which the cutting unit travels and a workpiece clamping mechanism for securing the cutting unit to a fixed position along the length of the workpiece. The clamping mechanism includes a pair of opposed levers for movement into and out of engaging contact with the workpiece. In accordance with the invention adjustable stop means are provided to limit the movement of the clamping levers away from the workpiece so as to minimize the movement later required for re-engagement with the workpiece.

8 Claims, 3 Drawing Figures

CUTTING MACHINE CLAMPING DEVICE

BACKGROUND OF THE INVENTION

This invention relates to cutting machines particularly cutting machines which employ gas cutting torches for separating workpieces into individual segments. The invention is particularly adapted for use with continuous castings wherein the continuous casting is separated into individual sections or slabs by traversing a cutting machine completely across the width of the casting. During this cutting operation, however, the casting is moving in a longitudinal direction. Accordingly, such cutting machines are clamped to the sides of the casting or workpiece to assure proper orientation between the cutting machine and casting so that the cutting machine properly moves across the casting in a transverse direction while the casting itself is moving longitudinally. Conventionally, such cutting machines are mounted on at least one transverse track disposed above and across the width of the workpiece so that the cutting machine can thereby move across the workpiece. The invention particularly relates to such mounting means which includes a clamping mechanism in the form of two opposed clamping levers having clamping devices at their ends for moving into engagement with the workpiece. After a cutting operation has been completed it is necessary to disengage the levers and move the machine to a different location along the workpiece for the next cutting operation whereupon the clamping levers are again engaged with the workpiece.

The clamping levers are preferably swung or moved by means of penumatic cylinders around their stationary location. When, after separation of the workpiece, the clamping levers are again to be disengaged, the clamping levers are driven back into their starting position, as noted above. If the path of the backswing of the levers into the starting position is relatively short, as when wide workpieces, e.g. of 2000 mm. and more, are being clamped there is no particular problem for re-engaging the levers. Frequently, however, narrow castings (e.g. 900 mm.) are being cut whereby a rather long backswing or return of the levers to their original open positions is required. There are thus disadvantages for workpieces of less width. Namely because of the relatively long backswing of the clamping levers into their starting position, useless time is lost, until the next clamping can be carried out. Furthermore, with pneumatic clamping devices, an increased amount of compressed air is required.

SUMMARY OF INVENTION

Therefore, an object of the present invention is to provide a clamping device for a cutting machine which minimizes re-clamping time even if the workpiece is relatively narrow.

For the solution of the above-mentioned problem it is proposed according to the invention, that to each clamping lever a barrier or stop means is assigned which limits the back movement from its clamping position.

A preferred method for carrying out the invention, is characterized in that as the barrier a toothed segment or ratchet is provided on the clamping lever, and a stationary stop bolt or pawl is disposed for engaging this toothed segment.

Due to this toothed segment barrier, it is possible in advantageous way, particularly when slabs, strands, etc. of small width are separated, to reduce the backswing of the clamping levers (after the separation), so that the levers are removed only a short distance from the casting and do not, as in the prior art always return into their maximim starting position. Due to the toothed-segment barrier, it is possible in a convenient manner, to adjust the backswing of the clamping levers, in accordance with the respective width of the workpiece a minimal distance (e.g. 100 mm.) by selection of the proper tooth for engagement with the stop bolt or pawl.

To make possible a maximum back movement of the clamping levers into their starting position, it is only necessary to lift out the toothed segment barrier to an inoperative position. This can be accomplished by a further inventive proposal, in that a lifting cylinder is provided for the toothed segment. By releasing the barrier, it is thus possible for the clamping levers to swingback into their maximum starting position, so that then even very broad workpieces can be clamped.

According to another inventive proposal, a stop bolt arranged on a stationary member is disposed in the path of movement of the lever to act as a barrier. The correspondingly assigned clamping lever strikes this stop bolt, and is thus hindered on a further back movement after the clamping is released.

In order to maintain this minimal backswing and yet accommodate workpieces of different width, the pickup or stationary members includes several borings arranged in succession, for a like member of stop bolts. These individual borings can be compared with the teeth of the toothed segment barrier of the first-mentioned example of the operation. In order to change the permissible backswing of the clamping levers after the releasing action where there is a change in workpiece width, it is then only necessary to select in dependence upon the width of the workpieces, the proper stop bolt to move into the path of the lever.

This selecting process may be manual or may be automatized according to a further advantageous inventive proposal. This proposal is characterized by one or more pneumatic or hydraulic piston-cylinder arrangements for the displacement of the stop bolt or bolts into the path of the clamping levers. In this case, the desired limitation of the backswing of the clamping levers, can be taken care of from the steering platform of the machine. Such can also be done in the case of the toothed segment-barrier. Then only the corresponding control button has to be activated, and the assigned stop bolt is pushed out of the boring by means of a piston-cylinder arrangement and blocks the further return path of the clamping lever.

In the case of a gas-cutting machine of the kind previously described it is finally still of advantage that the pivot of each clamping lever is provided above the path of attack of the clamping cylinder at the transverse track. Due to this advantageous position of the clamping lever, it is attained that the backswing can be kept in a relatively large curvature and thus can be kept flat, so that thereby it is also assured that the gas-cutting machine can be clamped on relatively flat workpieces.

THE DRAWINGS

FIGS. 1A and 1B are simplified arrangements in elevation of the clamping device on a gas-cutting machine, illustrating, respectively, both of the embodiments according to the invention for the limitation of the clamping lever path; and FIG. 2 is a plan view of the modification of FIG. 1B.

DETAILED DESCRIPTION

Figure 1A:
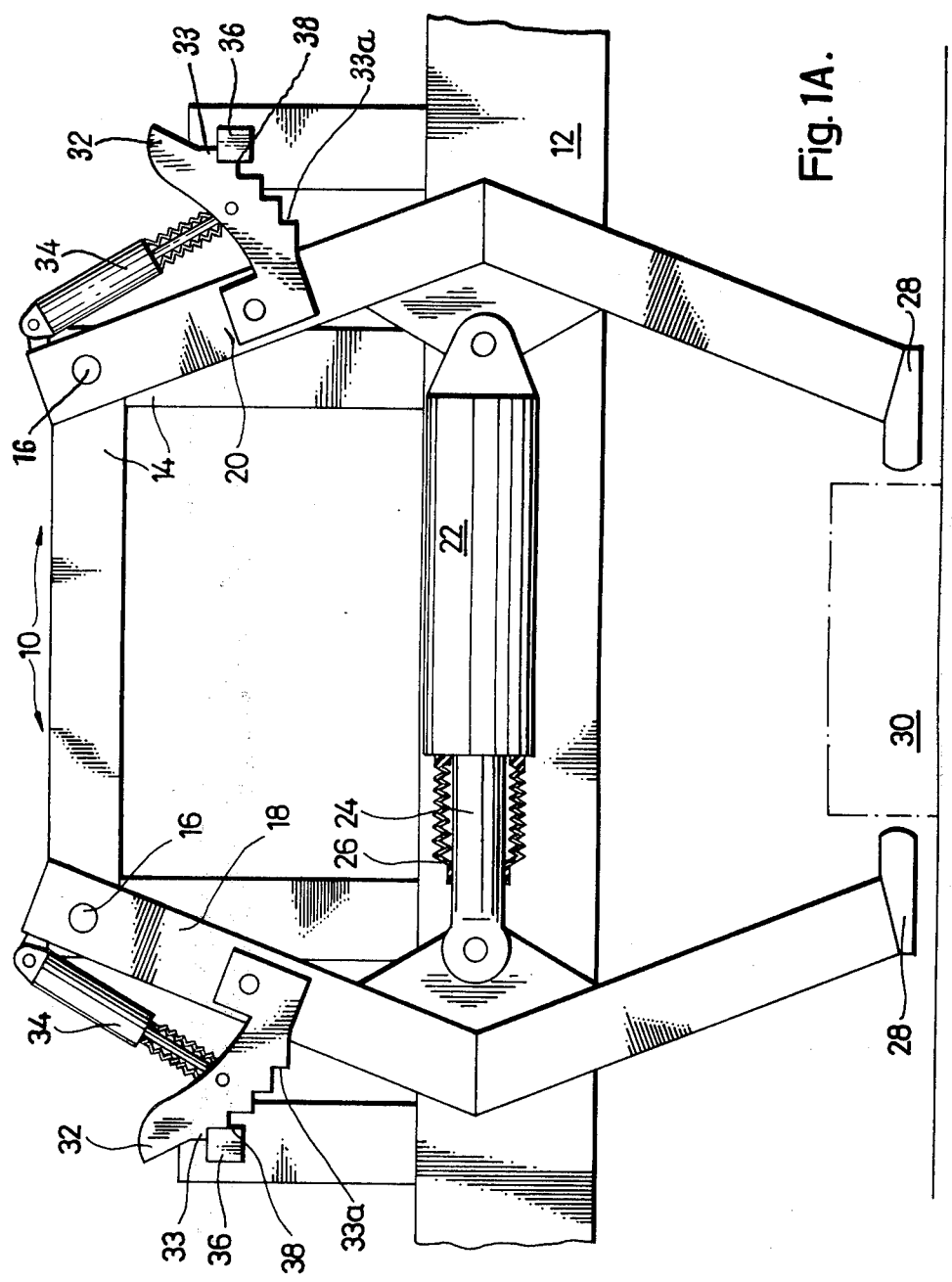
Figure 1B:
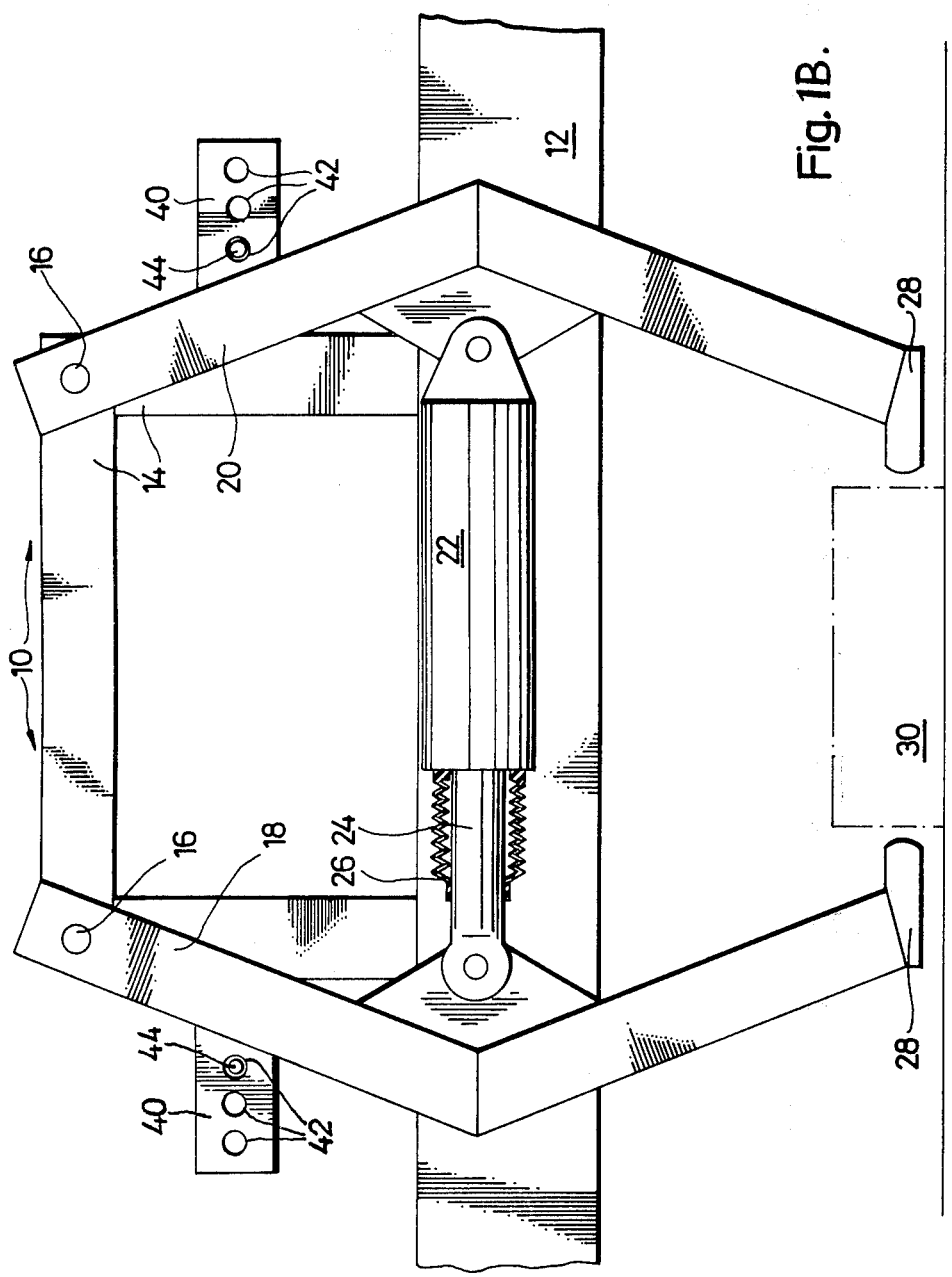

FIGS. 1A and 1B show the simplified construction of a clamping device 10 as it is used at gas-cutting machines, in particular for the separating of continuous castings. The gas-cutting machine itself is of known construction and is not shown for the sake of simplicity.

The clamping device 10 is carried by a transverse track 12, on which furthermore also the (not-shown) cutting unit which is arranged for moving transversely to the longitudinal axis. According to the examples represented in FIGS. 1A and 1B, a frame 14 is disposed on the transverse track 12. In the upper range of the frame in FIGS. 1A and 1B, bearings 16 are provided, which serve as pivots for the tiltable clamping levers 18, 20 of the clamping device 10.

The clamping levers 18, 20 are formed as angular levers in the middle of which a clamping actuating cylinder 22 is arranged. The clamping cylinder is flexibly or pivotally fastened at one end to, for example, the one clamping lever 20 while on the other clamping lever 18 the piston rod 24 is hinged. The free part of the piston rod 24 which projects outwardly at times from the clamping cylinder is encased by a bellows for protection against dust, debris, etc.

At the lower end of each clamping lever 18, 20, tension claws or clamping members 28 are provided by means of which the workpiece 30 to be separated is clamped and in this way the displaceable part of the gas-cutting machine, is likewise displaced during the separating process by the workpiece 30 which moves slowly forward in its longitudinal direction.

As can further be seen from FIG. 1A, at the upper arm of clamping lever 18 there is a toothed segment or ratchet 32 pivotally arranged. This toothed segment is held by the piston rod of a lifting cylinder 34, being fastened within the range of bearing 16 of the clamping lever 18.

The toothed segment 32 is in active connection with a stop bolt 36 which in turn is stationarily arranged on the gas-cutting machine.

As illustrated, a second stop or barrier arrangement is provided for lever 20 identical but as a mirror image of the arrangement 32–36 illustrated with respect to lever 18.

FIG. 1B illustrates a further type of barrier in accordance with an alternative form of this invention. This alternative 40–44 is also illustrated in plan view in FIG. 2. Similarly, not only lever 20 is illustrated as being provided with the alternative barrier, in practice a second mirror image barrier is provided for lever 18 as also illustrated in FIG. 1B.

Referring again to barrier 32–36 when a workpiece 30 is to be separated, first of all the clamping levers 18, 20 are moved toward each other into clamping position with workpiece 30 in which then the gas-cutting machine, i.e. its displaceable part, is carried along by the moving workpiece. After the clamping has taken place lifting cylinder 34 is actuated and the toothed segment 32 is lowered or brought into a position where a tooth will be moved into contact with stop bolt 36 upon outward movement of the levers 18, 20 as illustrated e.g. in FIG. 1A.

When the cutting operation has been completed, the clamping levers 18, 22 are swung back into their position of rest by the clamping cylinder 22 out of their clamping position on workpiece 30.

With prior art arrangements it was customary that the clamping levers were always moved back into their maximum starting position (that is the piston rod 24 was fully extended). However, in accordance with this invention this is no longer possible because the levers 18, 20 move back only until the tooth flank 33 being disposed toward the stop surface 38, strikes the latter.

The teething of the toothed segment is chosen advantageously so that between neighboring tooth flanks, a working clearance of e.g. 150 mm. exists. Therefore, this means that each clamping lever is capable of swinging back a maximum of 150 mm. from its clamping position. This backswing track (to the striking of the tooth flank 33 at the stop bolt surface 38) is sufficient, to obtain an orderly release of the clamping levers from their clamping position as illustrated in FIG. 1A.

For the next clamping of the workpiece having the same width, the clamping levers merely have to go back the minimal swinging path (e.g. a maximum 150 mm.) in order to be able to clamp the machine again on the workpiece.

When it is necessary to clamp the gas-cutting machine on a workpiece of greater width, the piston rod of lifting cylinder 34 is retracted whereby the toothed segment 32 is swung out of the range of action of the stop bolt 36, so that then the clamping levers 18, 20 are moved into their maximum starting position by fully extending piston rod 24 of cylinder 22.

Similarly for such wider workpieces the clamping levers move close to the side surfaces of the workpiece 30 and clamp the gas-cutting machine thereon. With a wider workpiece a lower tooth, e.g. the tooth flank 33a, would have to be positioned to come into the range of action of the stop bolt area 38, since now, because of the wider workpiece, the distance of the tension claws 28 is greater. After the separation or cutting of the workpiece 30, the two clamping levers swing back until the tooth flanks 33a lies against the stop surface 38. The proper positioning of the toothed segment 32 is assured by the lifting cylinder 34.

Another way of carrying out a barrier according to the invention, is illustrated in FIG. 1B which is arranged likewise on both clamping levers 18, 20.

This barrier consists of a plate-like stationary pickup 40, in which one or more in the exemplified embodiment three borings 42 are provided and which is mounted to a stationary member adjacent lever 20. The borings are arranged in a horizontal plane one after the other, and serve for the housing of a stop bolt 44 which interrupts the back movement of each clamping lever 18, 20. Depending upon which one of the borings the stop bolt 44 will be inserted in accordance with the width of the workpiece the clamping lever moves back correspondingly far. Therefore, by the stop bolt 44 it is assured that the clamping levers 18, 20 swing back only to a certain extent (e.g. 150 mm.) from the clamping position into the position of rest.

Since due to the barrier (32–38 or 40–44) which prevents further movement of the clamping lever, the pressure in the clamping cylinder 22 is increased for a short time, a relief pressure valve is arranged in the supply pipe line of the cylinder, via which, when a certain pressure is reached, the hydraulic control is switched off.

The changing of the stop bolt 44 into the boring 42, required at times of the pickup 40, is carried out by hand by the service personnel. However, it is also possible to provide for the change of the stop bolt automatically.

Figure 2:
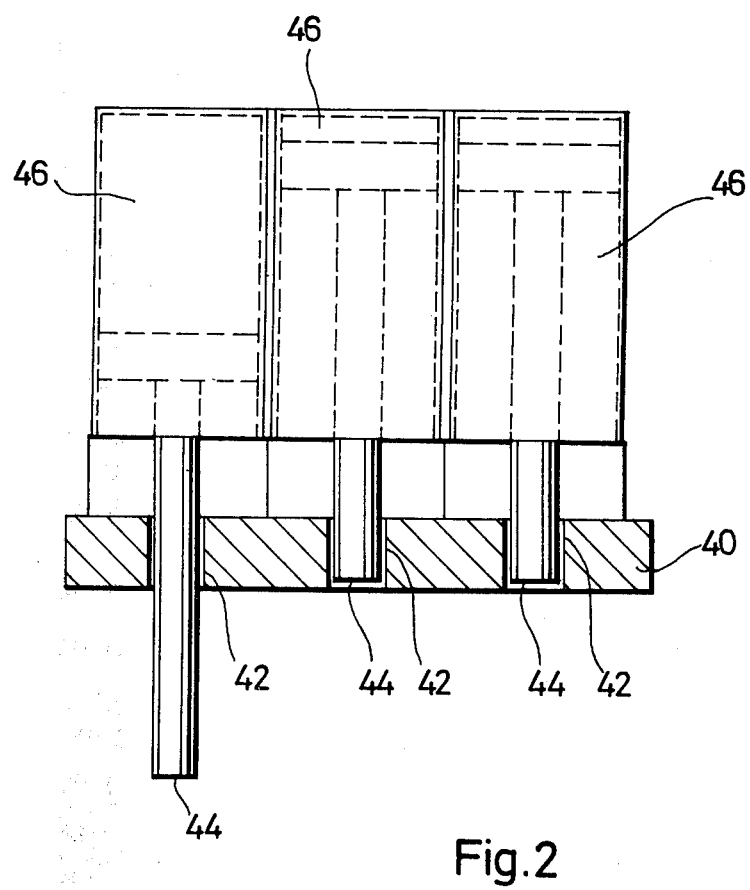

Such a possibility is shown simplified in FIG. 2. As stop bolts 44 are used here the free end of piston-cylinder arrangements 46 are arranged at the back side of the pickup member 40. In dependence upon the width of the workpiece having to be separated, the corresponding piston-cylinder 46 is switched on and its piston (i.e. stop bolt 44) pushes itself out of boring 42 and into the swinging path of the clamping lever 18, 20.

With the above-described construction of barriers, it is possible advantageously in dependence upon the width of each workpiece, to limit the back movement of the clamping lever after releasing the clamping always to a short stretch of path, e.g. 150 mm., regardless of workpiece width so that the clamping levers, in particular with the workpieces of narrow width (e.g. 900 mm.), do not any longer have to carry out the entire back movement to the maximum starting position, which, as a rule is required only when workpieces of great width (e.g. 2200 mm.) must be clamped in. The barrier of the invention has the additional advantage that because of its simple construction, it can operate in rough foundry work, without disturbance and maintenance.

What is claimed is:

1. A cutting machine clamping device comprising, in combination, a cutting machine for separating workpieces into individual segments, said cutting machine including a cutting unit, mounting means for mounting said cutting unit above the workpiece to traverse the width of the workpiece whereby the cutting unit may cut therethrough, said mounting means including rail means for being disposed over and across the workpiece and on which the cutting unit may travel, said mounting means further including a workpiece clamping mechanism for detachably securing said cutting unit to the workpiece at a fixed position along the length thereof, said clamping mechanism including a pair of opposed levers, clamping means on an end of each of said levers, pivotal securing means mounting said levers for movement toward and away from each other along a predetermined path whereby said clamping means may be moved into and out of engaging contact with the workpiece, barrier means for movement into said path whereby the movement of said clamping levers away from the workpiece is limited to minimize the subsequent return movement of said clamping levers when its clamping means later re-engages the workpiece, said barrier means being adjustable for adjustably preselecting the distance of movement permitted by said clamping levers whereby the distance of movement may be controlled in accordance with the width of the workpiece, said barrier means including a toothed segment mounted on at least one of said clamping levers, a stationary stop member disposed in the path of movement of one of the teeth on said segment, and a lifting cylinder connected to said toothed segment for adjusting the position of said segment whereby a preselected tooth may be disposed for contacting said stop member.

2. A cutting machine clamping device comprising, in combination, a cutting machine for separating workpieces into individual segments, said cutting machine including a cutting unit, mounting means for mounting said cutting unit above the workpiece to traverse the width of the workpiece whereby the cutting unit may cut therethrough, said mounting means including rail means for being disposed over and across the workpiece and on which the cutting unit may travel, said mounting means further including a workpiece clamping mechanism for detachably securing said cutting unit to the workpiece at a fixed position along the length thereof, said clamping mechanism including a pair of opposed levers clamping means on an end of each of said levets, pivotal securing means mounting said levers for movement toward and away from each other along a predetermined path whereby said clamping means may be moved into and out of engaging contact with the workpiece, barrier means for movement into said path whereby the movement of said clamping levers away from the workpiece is limited to minimize the subsequent return movement of said clamping levers when its clamping means later re-engages the workpiece, said barrier means being adjustable for adjustably preselecting the distance of movement permitted by said clamping levers whereby the distance of movement may be controlled in accordance with the width of the workpiece, said barrier means including a stationary pickup member mounted ajdacent the path of movement of at least one of said clamping levers, and at least one stop bolt slidably mounted in said pickup member and disposed for being positioned into the path of movement of its clamping lever.

3. A device as set forth in claim 2 wherein said pickup member includes a plurality of borings disposed different distances with respect to the path of movement of its clamping lever, and one of said stop bolts being disposed in each of said borings whereby the selection of a respective stop bolt for insertion into the path of movement of its clamping lever determines the length of movement of its clamping lever.

4. A device as set forth in claim 3 including a power actuated piston-cylinder arrangement for each of said borings and its respective stop bolt, and each stop bolt being mounted selectively into and out of the path of movement of its clamping lever by actuation of its respective piston-cylinder arrangement.

5. A cutting machine clamping device comprising, in combination, a cutting machine for separating workpieces into individual segments, said cutting machine including a cutting unit, mounting means for mounting said cutting unit above the workpiece to traverse the width of the workpiece whereby the cutting unit may cut therethrough, said mounting means including rail means for being disposed over and across the workpiece and on which the cutting unit may travel, said mounting means further including a workpiece clamping mechanism for detachably securing said cutting unit to the workpiece at a fixed position along the length thereof, said clamping mechanism including a pair of opposed levers, clamping means on an end of each of said levers, pivotal securing means mounting said levers for movement toward and away from each other along a predetermined path whereby said clamping means may be moved into and out of engaging contact with the workpiece, barrier means for movement into said path whereby the movement of siad clamping levers away from the workpiece is limited to minimize the subsequent return movement of said clamping levers when its clamping means later re-engages the workpiece, said barrier means being adjustable for adjustably preselecting the distance of movement permitted by said clamping levers whereby the distance of movement may be controlled in accordance with the width of the workpiece, said clamping levers being movable toward and away from each other into and out of clamping engagement by means of a clamping cylinder connecting said clamping levers to each other, and each of said clamping levers being pivotally mounted at a point above the line of action of said clamping cylinder.

6. In a method of cutting continuous castings into individual segments while the casting moves longitudinally wherein a cutting machine moves across the width of the continuous casting and is clamped to the continuous casting by means of clamping levers which move along a path of movement into and out of clamping engagement with the casting, the improvement comprising disposing a barrier in the path of movement of at least one of the clamping levers after the clamping levers have been moved into clamping engagement with the workpiece whereby the distance of movement of the clamping lever in its non-engaging direction is limited to minimize the amount of movement required for subsequent reclamping of the clamping levers with the workpiece, the barrier having a plurality of preselected poisitons with respect to the path of movement of its clamping lever, and including the step of selecting the position of the barrier in accordance with the width of the casting, the position being selected to maintain a substantially uniform distance of movement of the clamping levers regardless of the width of the casting, the barrier including a toothed segment pivotally connected to its clamping lever and mounted at one end of a piston-cylinder arrangement with a stationary stop member disposed for contacting one of the teeth of said segment in accordance with the positioning of said segment, and including the step of selecting the positioning of said segment by controlled actuation of the piston-cylinder arrangement.

7. In a method of cutting continuous castings into individual segments while the casting moves longitudinally wherein a cutting machine moves across the width of the continuous casting and is clamped to the continuous casting by means of clamping levers which move along a path of movement into and out of clamping engagement with the casting, the improvement comprising disposing a barrier in the path of movement of at least one of the clamping levers after the clamping levers have been moved into clamping engagement with the workpiece whereby the distance of movement of the clamping lever in its non-engaging direction is limited to minimize the amount of movement required for subsequent reclamping of the clamping levers with the workpiece, the barrier having a plurality of preselected positions with respect to the path of movement of its clamping lever, and including the step of selecting the position of the barrier in accordance with the width of the casting, the position being selected to maintain a substantially uniform distance of movement of the clamping levers regardless of the width of the casting, the barrier including a stationary pickup member having a plurality of borings with a stop pin slidably mounted in each boring, and including the step of controlling the distance of movement of said clamping levers by selectively moving one of the stop bolts into the path of movement of its clamping lever.

8. In the method of claim 7 wherein for each of said stop bolts is provided with a piston-cylinder means, and including the step of automatically moving a predetermined stop bolt into the path of movement of its clamping lever by activation of its respective piston-cylinder means.

* * * * *